(12) United States Patent
Buchwald et al.

(10) Patent No.: US 11,032,112 B2
(45) Date of Patent: Jun. 8, 2021

(54) MULTI-CARRIER CREST FACTOR REDUCTION

(71) Applicant: MOTOROLA SOLUTIONS, INC., Chicago, IL (US)

(72) Inventors: Gregory J. Buchwald, Crystal Lake, IL (US); Apolinar Chaidez, South Elgin, IL (US); Rodney W. Hagen, Lake In The Hills, IL (US); Arthur Christopher Leyh, Spring Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/657,614

(22) Filed: Oct. 18, 2019

(65) Prior Publication Data

US 2021/0119839 A1    Apr. 22, 2021

(51) Int. Cl.
*H04L 27/00* (2006.01)
*H04L 27/20* (2006.01)
*H04W 88/08* (2009.01)

(52) U.S. Cl.
CPC .......... *H04L 27/0014* (2013.01); *H04L 27/20* (2013.01); *H04L 2027/0018* (2013.01); *H04W 88/08* (2013.01)

(58) Field of Classification Search
CPC .............................................. H04L 27/00–389
See application file for complete search history.

(56) References Cited

U.S. PATENT DOCUMENTS 5,302,914 A * 4/1994 Arntz ........................ H03F 1/34
                                                    330/124 R
6,006,111 A * 12/1999 Rowland ................. H03F 3/602
                                                    330/124 R
(Continued)

FOREIGN PATENT DOCUMENTS

DE         19850642 A1     5/2000
EP          1168748 A2     1/2002
(Continued)

OTHER PUBLICATIONS

International Search Report and Written Opinion for Application No. PCT/US2020/052173 dated Jan. 21, 2021 (17 pages).
(Continued)

*Primary Examiner* — Gennadiy Tsvey
(74) *Attorney, Agent, or Firm* — Michael Bestand Friedrich LLP (57) ABSTRACT

A base station device and a method for multi-carrier crest factor reduction are provided. The method includes generating, using a plurality of radio frequency sources, a plurality of radio frequency carrier signals. The method also includes initiating modulation, using a plurality of carrier modulators, of a first subset of the plurality of radio frequency carrier signals with information signals at a first time to generate a plurality of modulated signals and initiating modulation, using the plurality of carrier modulators, of a second subset of the plurality of radio frequency carrier signals with the information signals at a second time to generate the plurality of modulated signals. The second time is a predetermined time offset after the first time. The method also includes transmitting, using one or more antennae, a multi-carrier signal including the plurality of modulated signals.

20 Claims, 9 Drawing Sheets

(56) References Cited

U.S. PATENT DOCUMENTS

| | | | |
|---|---|---|---|
| 6,094,458 A * | 7/2000 | Hellberg | H03F 3/24 341/143 |
| 6,125,103 A * | 9/2000 | Bauml | H04L 27/2602 370/203 |
| 6,330,289 B1 * | 12/2001 | Keashly | H04L 5/06 375/297 |
| 6,590,906 B1 * | 7/2003 | Ishida | H04L 27/2602 370/480 |
| 7,391,713 B2 | 6/2008 | Anvari | |
| 7,486,738 B2 * | 2/2009 | Trivedi | H04L 27/2614 370/206 |
| 7,839,951 B2 | 11/2010 | Cai et al. | |
| 7,944,991 B2 | 5/2011 | Zhao et al. | |
| 8,599,961 B2 | 12/2013 | Schmidt et al. | |
| 8,619,903 B2 | 12/2013 | Schmidt et al. | |
| 9,065,716 B1 * | 6/2015 | Bynum | G08G 5/0013 |
| 9,094,107 B1 * | 7/2015 | Kumar | H04L 27/12 |
| 10,439,854 B1 | 10/2019 | Huang | H04L 27/2621 |
| 2003/0202611 A1 * | 10/2003 | Montojo | H04L 5/0019 375/260 |
| 2004/0100210 A1 * | 5/2004 | Hori | H04B 1/707 315/307 |
| 2004/0266372 A1 * | 12/2004 | McCallister | H04B 1/0475 455/127.2 |
| 2006/0008015 A1 * | 1/2006 | Marsili | H04K 1/00 375/260 |
| 2006/0250113 A1 * | 11/2006 | Tsai | H01M 2/1016 320/166 |
| 2007/0161356 A1 * | 7/2007 | Hoon | H04W 52/52 455/115.1 |
| 2007/0254592 A1 * | 11/2007 | McCallister | H03F 3/24 455/67.11 |
| 2009/0310710 A1 * | 12/2009 | Farrokhi | H04L 27/2621 375/302 |
| 2010/0098139 A1 * | 4/2010 | Braithwaite | H04L 27/2621 375/219 |
| 2011/0286537 A1 * | 11/2011 | Stewart | H04L 5/0048 375/259 |
| 2012/0039281 A1 * | 2/2012 | Pajukoski | H04J 11/003 370/329 |
| 2014/0044215 A1 | 2/2014 | Mundarath et al. | |
| 2014/0112242 A1 * | 4/2014 | Vilmur | H04W 16/26 370/327 |
| 2017/0006620 A1 * | 1/2017 | Reis | H04L 43/16 |
| 2017/0126454 A1 * | 5/2017 | Huan | H04L 27/2614 |
| 2019/0021080 A1 * | 1/2019 | Lei | H04B 7/0617 |
| 2019/0222447 A1 * | 7/2019 | Vos | H04L 5/0051 |
| 2019/0386690 A1 * | 12/2019 | Hashemi | H03F 3/245 |
| 2020/0092150 A1 * | 3/2020 | Choi | H04L 27/2636 |

FOREIGN PATENT DOCUMENTS

| | | |
|---|---|---|
| KR | 20000068425 A | 11/2000 |
| WO | 9613918 A1 | 5/1996 |
| WO | 0103319 A1 | 1/2001 |
| WO | 03092235 A1 | 11/2003 |

OTHER PUBLICATIONS

Gimlin et al., "On Minimizing the Peak-to-Average Power Ratio for the Sum of N Sinusoids," IEEE Transactions on Communications, 1993, vol. 41, No. 4, pp. 631-635.

* cited by examiner

MULTI-CARRIER CREST FACTOR REDUCTION

BACKGROUND OF THE INVENTION

Multi-carrier base station devices and transmitters (referred to as radio frequency (RF) transmitters) are used in cellular and land mobile radio (LMR) technologies to transmit radio signals over multiple carriers (that is, channels). One or more carrier signals are encoded with information and transmitted to user devices (for example, smart telephones, mobile radios, and/or portable radios).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When linearly modulated waveforms are used in a multi-carrier system, the resultant output waveform includes an added Crest factor such that the output waveform does not include a constant envelope. The multi-carrier base station device is desired to handle a composite peak power for all (for example, up to 12) of the carriers of the base station device simultaneously. This places additional demands of several decibels (dB) to the peak power capability of a power amplifier used with the multi-carrier base station device compared to a system that uses a standard, constant envelope continuous four level frequency modulation (C4FM) and analog frequency modulation (FM). The power amplifier used in the multi-carrier base station device is therefore desired to handle a large peak to average ratio without peak power compression of the composite waveform. The cost per watt of carrier and mains line-in power consumption, supporting the composite peak power of a given waveform, goes up approximately proportional to the square of the peak envelope power desired. This also results in increasing the overall cost of the system.

Accordingly, there is a need for a method and a device to enable narrowband multi-carrier Crest factor reduction.

One embodiment provides a base station device for multi-carrier crest factor reduction. The base station device includes a plurality of radio frequency sources configured to generate a plurality of radio frequency carrier signals and a plurality of carrier modulators corresponding to the plurality of radio frequency sources and configured to modulate the plurality of radio frequency carrier signals with information signals and generate a plurality of modulated signals. The base station device also includes an electronic processor coupled to the plurality of carrier modulators. The electronic processor is configured to initiate modulation, using the plurality of carrier modulators, of a first subset of the plurality of radio frequency carrier signals at a first time and initiate modulation, using the plurality of carrier modulators, of a second subset of the plurality of radio frequency carrier signals at a second time. The second time is a predetermined time offset after the first time. The base station device also includes one or more antennae coupled to the plurality of carrier modulators and configured to transmit a multi-carrier signal including the plurality of modulated signals.

Another embodiment provides a method for multi-carrier crest factor reduction at a base station device. The method includes generating, using a plurality of radio frequency sources, a plurality of radio frequency carrier signals. The method also includes initiating modulation, using a plurality of carrier modulators, of a first subset of the plurality of radio frequency carrier signals with information signals at a first time to generate a plurality of modulated signals and initiating modulation, using the plurality of carrier modulators, of a second subset of the plurality of radio frequency carrier signals with the information signals at a second time to generate the plurality of modulated signals. The second time is a predetermined time offset after the first time. The method also includes transmitting, using one or more antennae, a multi-carrier signal including the plurality of modulated signals.

Figure 1:
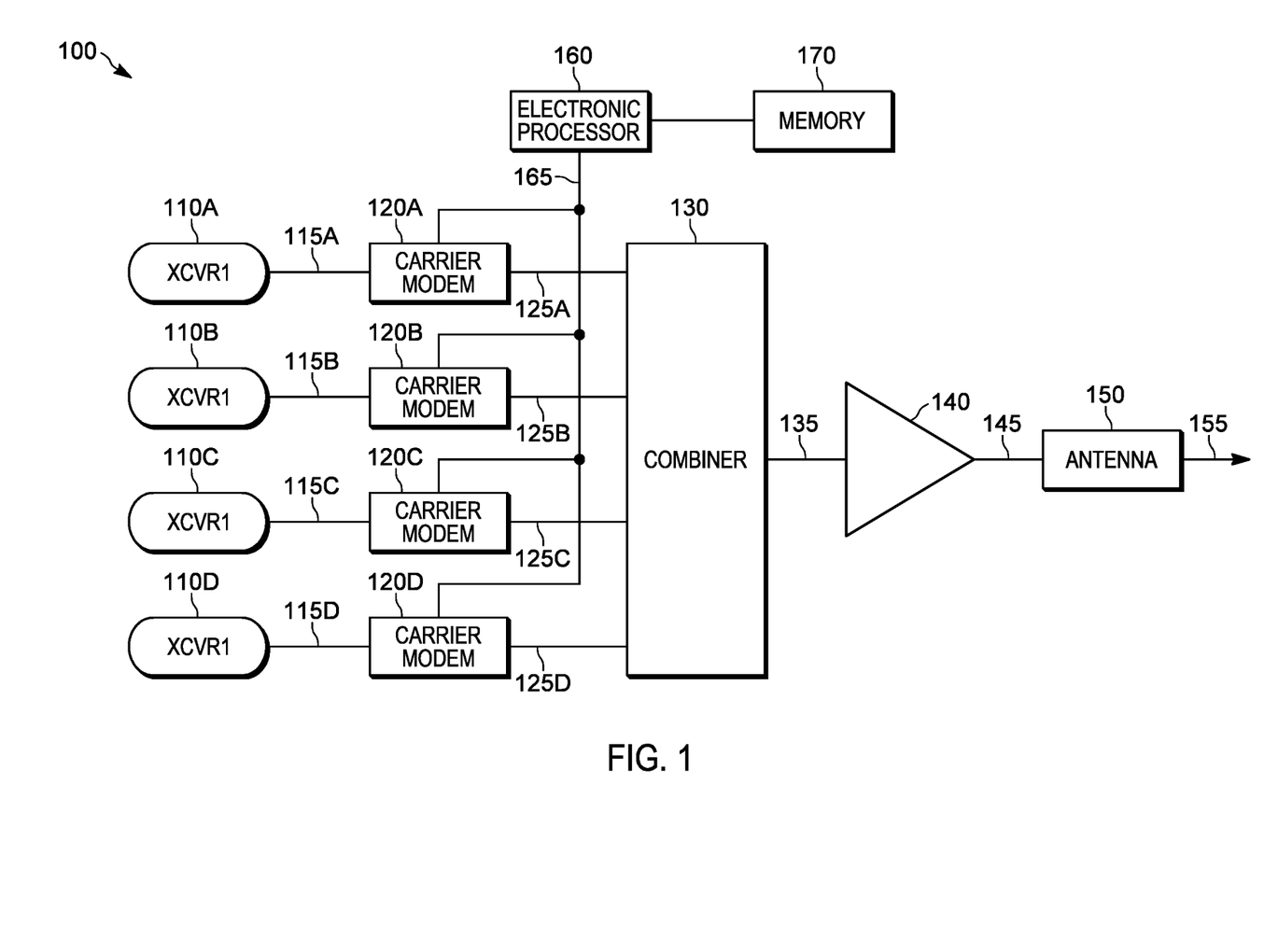
FIG. 1 is a simplified block diagram of a base station device in accordance with some embodiments.

FIG. 1 is a block diagram of an example base station device 100 in accordance with some embodiments. The base station device 100 is, for example, part of a land mobile radio base station site deployed by a public safety organization (for example, a police department, a fire department, and the like). The base station device 100 may include more or fewer components than those illustrated in FIG. 1 and may perform more or fewer functions than those described herein. In the example illustrated, the base station device 100 includes a plurality of radio frequency (RF) sources 110A-110D, a plurality of carrier modulators 120A-120D, a combiner 130, a multi-carrier power amplifier 140, an antenna 150, an electronic processor 160, and a memory

170. In one example, the base station device 100 can support up to twelve carriers and includes twelve radio frequency sources 110 each designated for a single carrier. In the example illustrated, the base station device 100 includes four carriers and includes four radio frequency sources 110 each designated for a single carrier. However, it will be appreciated that the scope of the present disclosure is also applicable to a base station device 100 having a different number of carriers.

The plurality of radio frequency sources 110 are configured to generate a plurality of radio frequency (RF) carrier signals 115A-115D. The plurality of carrier modulators 120 modulate the plurality of radio frequency carrier signals 115 with information to be sent to the user devices from the base station device 100. The plurality of carrier modulators 120 generate a plurality of modulated signals 125A-125D by modulating the plurality of radio frequency carrier signals 115 with information and provide the plurality of modulated signals 125 to the combiner 130. The combiner 130 combines the plurality of modulated signals 125 from the plurality of carrier modulators 120 to provide a combined signal 135 to a multi-carrier power amplifier 140. The multi-carrier power amplifier 140 amplifies the combined signal 135 and generates an amplified signal 145 for transmission. In the example illustrated, the combiner 130 provides a single combined signal 135 to a single multi-carrier power amplifier 140.

In some embodiments, the combiner 130 may combine the plurality of modulated signals 125 into the combined signal 135 and provide the combined signal 135 to an N-way splitter. The N-way splitter splits the combined signal 135 and provides the split signals to a plurality of multi-carrier power amplifiers 140. Whether a single multi-carrier power amplifier 140 is used or a plurality of multi-carrier power amplifiers 140 are used depends on the desired number of carrier signals and the configuration of the base station device 100. When a plurality of multi-carrier power amplifiers 140 are provided, the plurality of multi-carrier power amplifiers 140 are connected in parallel between the N-way splitter and an N-way combiner. The plurality of multi-carrier power amplifiers 140 amplify the split signals for and generate a plurality of amplified signals 145 for transmission.

The multi-carrier power amplifier 140 provides the amplified signal 145 to the antenna 150. The amplified signal 145 may be sent through a transmission post filter prior to broadcasting with the antenna 150 into the radio frequency spectrum.

An electronic processor 160 is coupled to the plurality of carrier modulators 120 and provides control signals 165 to the plurality of carrier modulators 120. The electronic processor 160 is also coupled to a memory 170. In some embodiments, the base station device 100 includes one electronic processor 160 and one memory 170 controlling the plurality of carrier modulators 120. In some embodiments, the base station device 100 includes one electronic processor 160 and one memory 170 per carrier modulator 120 that work together to implement the functionality as described herein.

In some embodiments, the electronic processor 160 is implemented as a microprocessor with separate memory, for example, the memory 170. In other embodiments, the electronic processor 160 is implemented as a microcontroller or digital signal processor (with memory 170 on the same chip). In other embodiments, the electronic processor 160 is implemented using multiple processors. In addition, the electronic processor 160 may be implemented partially or entirely as, for example, a field-programmable gate array (FPGA), an application specific integrated circuit (ASIC), and the like and the memory 170 may not be needed or be modified accordingly. In the example illustrated, the memory 170 includes non-transitory, computer-readable memory that stores instructions that are received and executed by the electronic processor 160 to carry out the functionality of the base station device 100 described herein. The memory 170 may include, for example, a program storage area and a data storage area. The program storage area and the data storage area may include combinations of different types of memory, for example, read-only memory and random-access memory.

Figure 2:
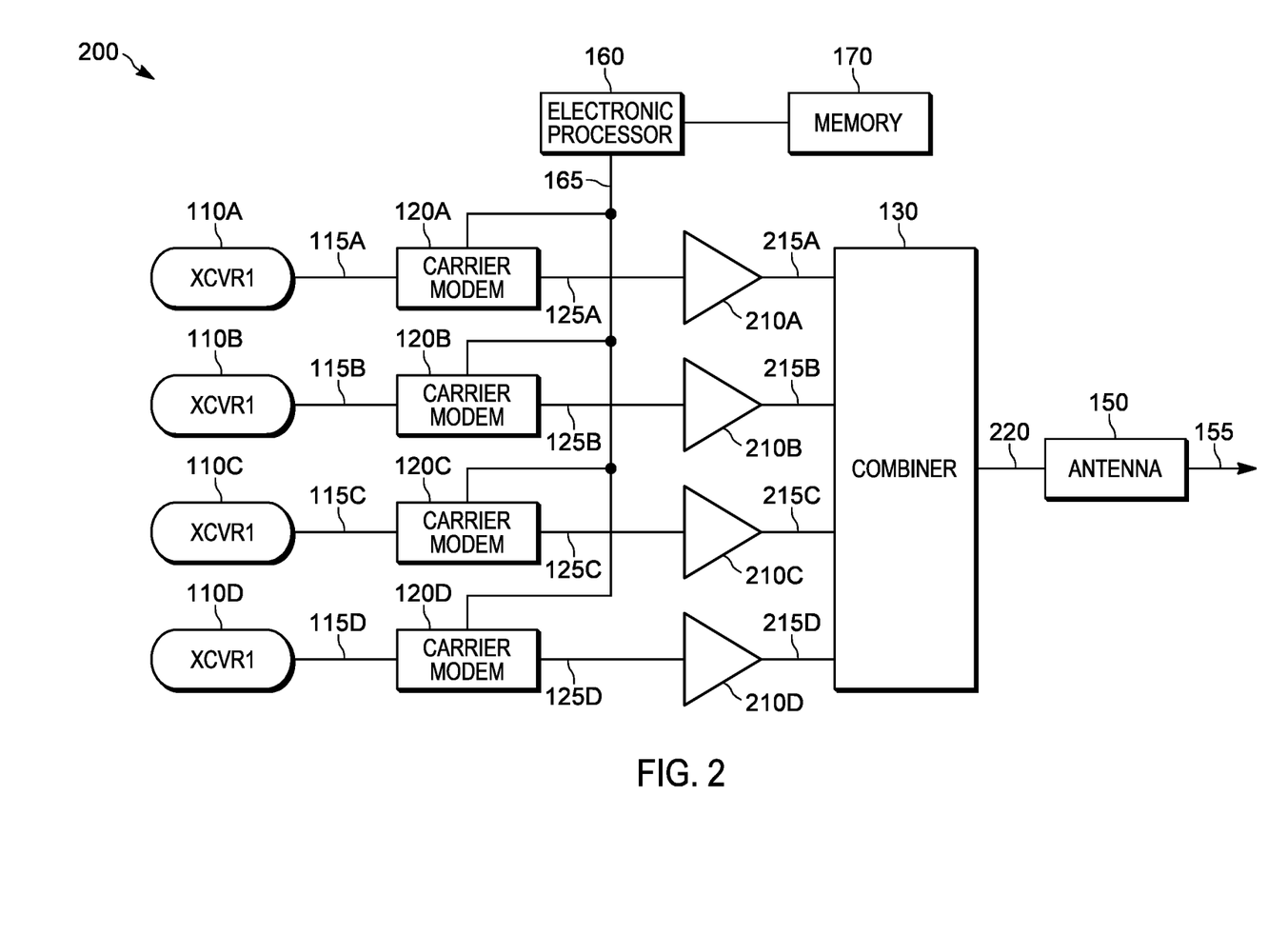
FIG. 2 is a simplified block diagram of a base station device in accordance with some embodiments.

FIG. 2 is a block diagram of an example base station device 200 in accordance with some embodiments. The base station device 200 is similar to the base station device 100 and includes similar components. In the example illustrated, the base station device 200 includes a plurality of linear power amplifiers 210 rather than one or more multi-carrier power amplifiers 140 as in the base station device 100. In the example illustrated in FIG. 2, the plurality of linear power amplifiers 210A-210D correspond to the plurality of radio frequency sources 110a-110D. The plurality of linear power amplifiers 210 individually amplify the plurality of modulated signals 125 and provide a plurality of amplified signals 215A-215D to the combiner 130. The combiner 130 combines the plurality of amplified signals 215 from the plurality of linear power amplifiers 210 to provide a combined amplified signal 220 to the antenna 150.

Figure 3A:
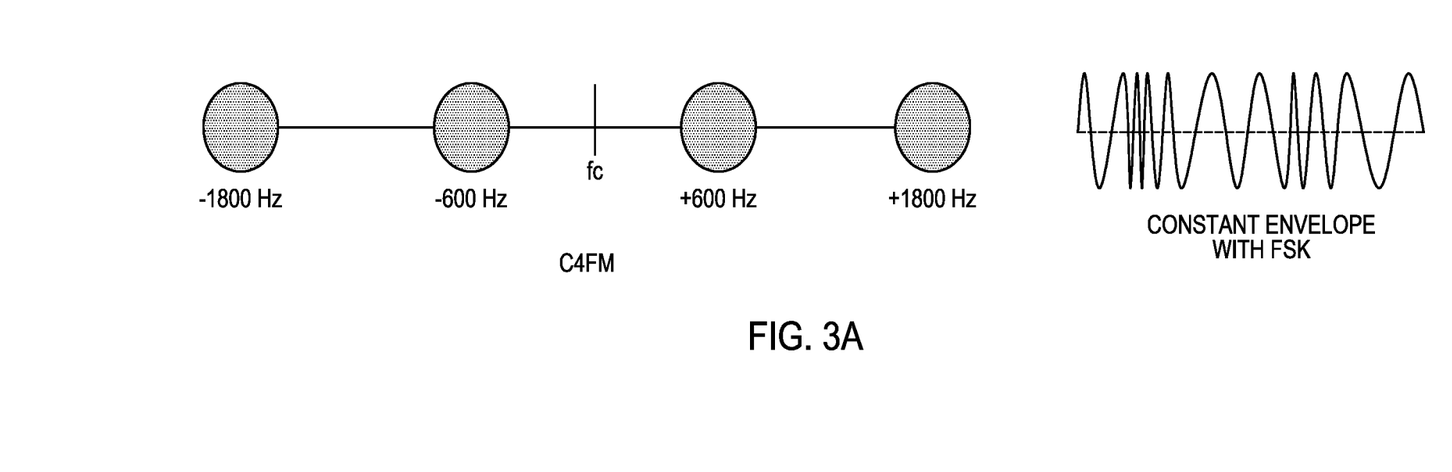
FIGS. 3A and 3B illustrate an output of the base station devices of FIGS. 1 and 2 including peaks in accordance with some embodiments.
Figure 3B:
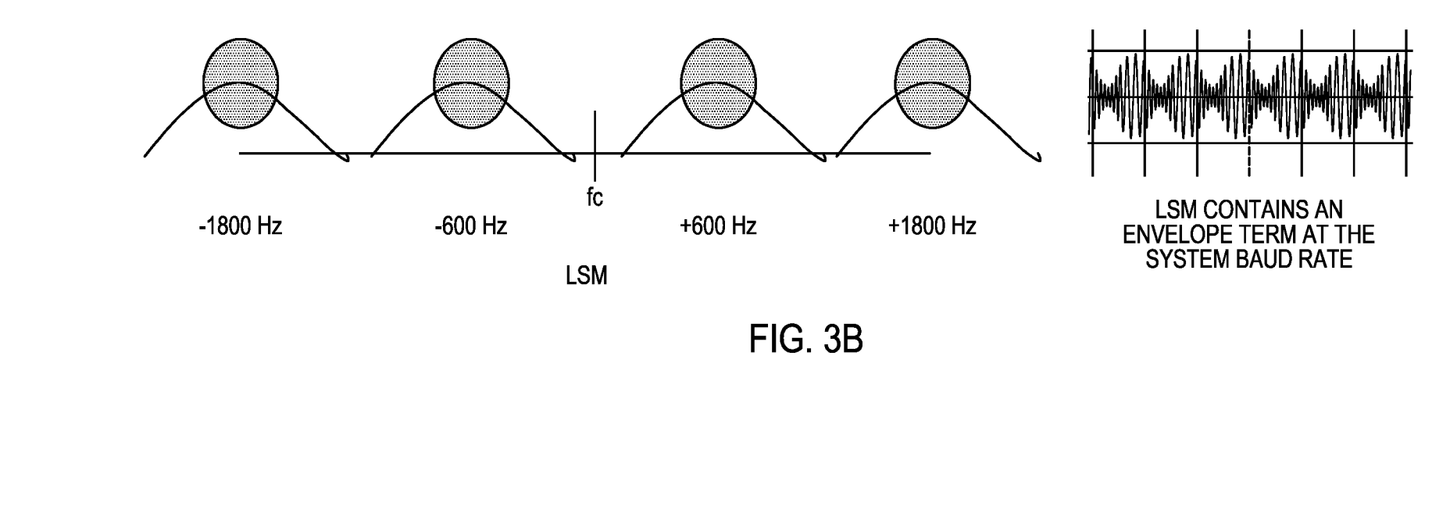

The output power characteristics of constant envelope systems, for example, a C4FM, and linearly modulated waveforms, for example, a linear simulcast modulation (LSM) are illustrated in FIGS. 3A and 3B. As can be seen from FIGS. 3A and 3B, both constant envelope systems and linearly modulated systems result in a peak power output distributed around the center frequency (fc). In the case of LSM, the peak power occurs at each data point where information is modulated on to the carrier waveform. In linearly modulated waveforms, the symbol launch rate or modulation rate of information signals follows a predictable pattern across the plurality of carrier modulators 120. That is, symbols are launched or modulated onto a first radio frequency carrier signal 115A at a rate synchronously with or at an integer multiple of the period of launching or modulating symbols onto a second radio frequency carrier signal 115B. In a multi-carrier system, such as the base station device 100, when the multiple carriers are linked to a synchronous data clock, the multiple carriers peak together. The power amplifiers 140, 210 and the antenna 150 are therefore desired to handle this peak power which is a sum of the peak powers (referred to as maximum peak power) of each individual carriers. A maximum peak power of the system is referred to as the crest factor.

In one example, rather than synchronizing multi-carriers to a synchronous data clock, the clocks of each carrier of the multi carrier system may be random and asynchronous with other clocks. Although this results in the maximum peak power occurring less frequently, the maximum peak power still occurs. That is, the crest factor of the base station device 100 is not reduced. Additionally, this results in the maximum peak power occurring unpredictably but with the same peak power requirement. In this example, the power amplifiers 140, 210 and the antenna 150 are still configured to handle the maximum peak power. In another example, peak power may be compressed to reduce the crest factor. However, this results in reduction of quality of the signal provided to the user devices.

Figure 4:
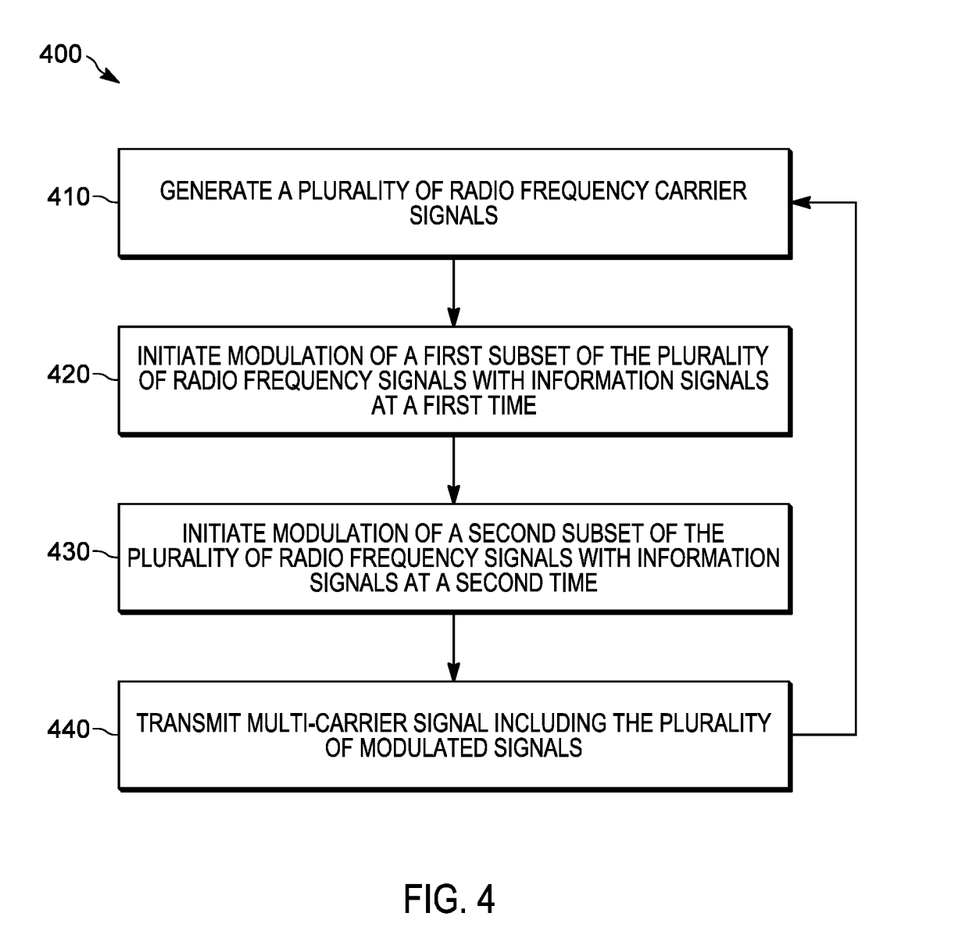
FIG. 4 is a flowchart of an example method for multi-carrier crest factor reduction at the base station devices of FIGS. 1 and 2 in accordance with some embodiments.

FIG. 4 illustrates a flowchart of an example method 400 for crest factor reduction at a base station device (that is, the base station devices 100, 200) in accordance with some embodiments. In the example illustrated, the method 400 includes generating, using the plurality of radio frequency sources 110, the plurality of radio frequency carrier signals 115 (at block 410). As discussed above, depending on the load (for example, number of calls) on the base station device 100, two or more radio frequency sources 110 are activated to generate two or more radio frequency carrier signals 115. The plurality of radio frequency carrier signals 115 exhibit a periodic and repetitive envelope modulation components that is synchronous to an envelope of the plurality of carriers present at the output of the antenna 150. One example of the periodic and repetitive envelope is shown in FIG. 3B.

The method 400 includes initiating modulation, using the plurality of carrier modulators 120, a first subset of the plurality of radio frequency carrier signals 115 with information signals at a first time (at block 420). The method 400 includes initiating modulation, using the plurality of carrier modulators 120, a second subset of the plurality of radio frequency carrier signals 115 with information signals at a second time (at block 430). The second time is a predetermined time offset after the first time. The electronic processor 160 controls the plurality of carrier modulators 120 to initiate modulation at the first time and at the second time. The plurality of carrier modulators 120 generate a plurality of modulated signals 125 by modulating the first subset of the plurality of radio frequency carrier signal 115 and the second subset of the plurality of radio frequency carrier signal 115. By changing the launch time of information signals (that is, by initiating modulation at predetermined times), the crest factor of the base station device 100 can be reduced. This crest factor reduction technique is explained with respect to two examples as provided below.

Figure 5A:
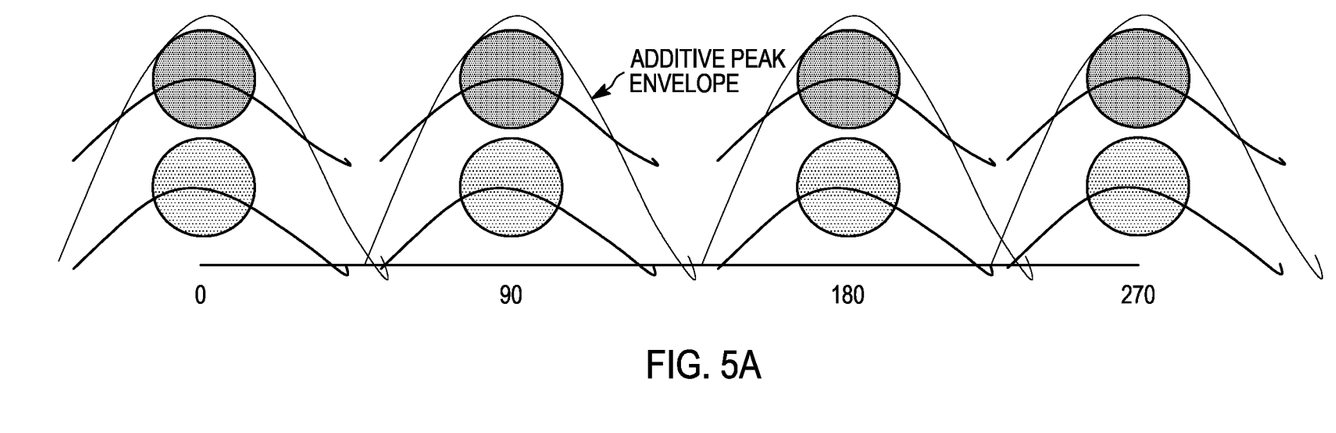
FIGS. 5A through 5D illustrate a modified output of the base station devices of FIGS. 1 and 2 including peaks in accordance with some embodiments.
Figure 5B:
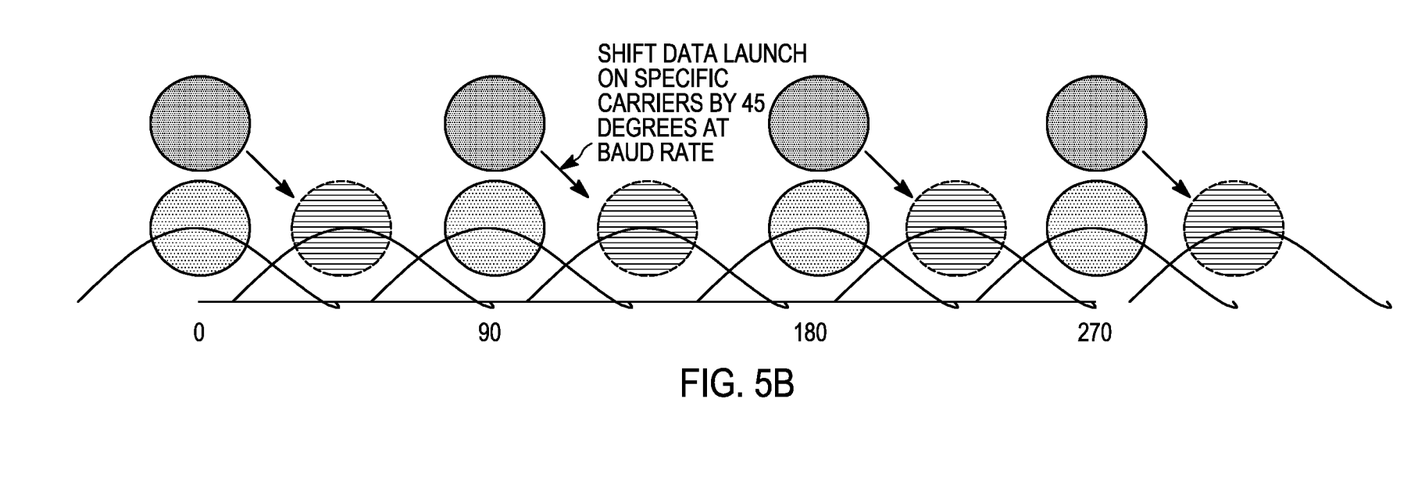
Figure 5C:
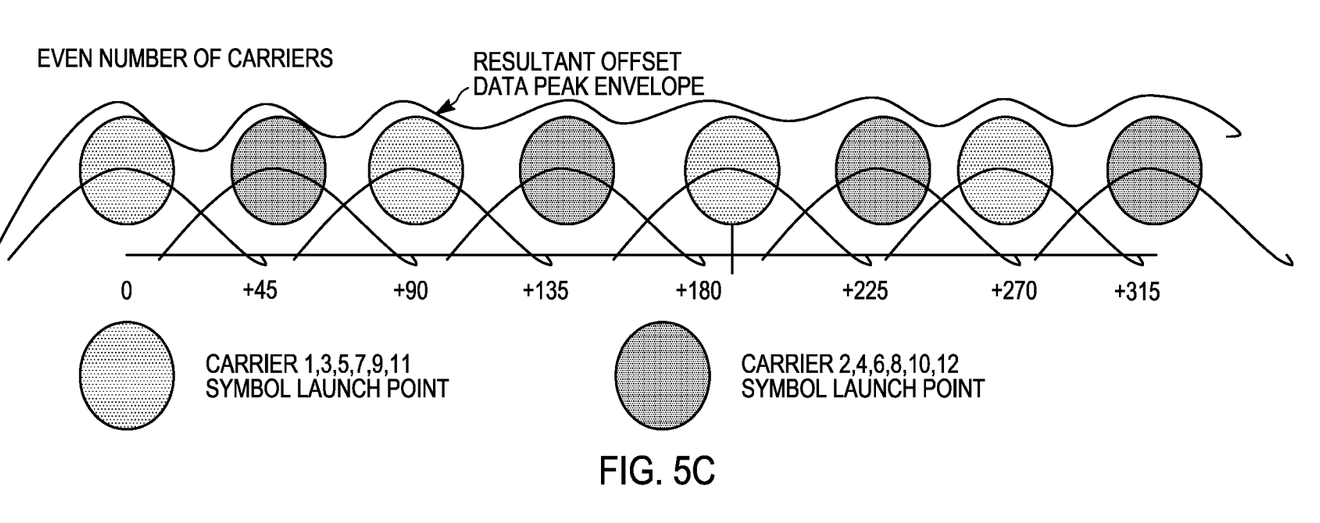

In one example, the base station device 100 is operating with an even number of carrier signals, that is, two radio frequency sources 110A, 110B are activated. The two radio frequency sources 110A, 110B generate corresponding radio frequency carrier signals 115A, 115B. In a base station device 100 that does not use the crest factor reduction technique of method 400, the output multi-carrier signal 155 exhibits additive peaks as shown in FIG. 5A. In this base station device 100, the symbols or information is modulated onto the radio frequency carrier signals 115A, 115B at the same time resulting in the output multi-carrier signal 155 exhibiting maximum peak power at predicted 90 degree intervals. In this example, using the crest factor reduction technique of method 400, a first carrier modulator 120A initiates the modulation of the first radio frequency carrier signal 115A at a first time, for example, at time 0. A second carrier modulator 120B initiates the modulation of the second radio frequency carrier signal 115B at a second time that is the predetermined time offset after the first time. That is, as shown in FIG. 5B, the launch time of information signals on the second radio frequency carrier signal 115B is shifted by 45 degrees in phase. In this example, the predetermined time offset is selected to be half a period of a baud rate of the information signals to effectuate a 45 degree phase shift of the peak power of the second modulated signal 125B. The resultant power characteristics of the output multi-carrier signal 155 is illustrated in FIG. 5C. As shown in FIG. 5C, the peaks are evenly distributed resulting in a reduction of the crest factor. Similarly, for any even number of carriers, the plurality of radio frequency carrier signals 115 may be divided into a first subset and a second subset such that the first subset is launched at the first time and the second subset is launched at the second time thereby reducing the crest factor of the output multi-carrier signal 155.

Figure 5D:
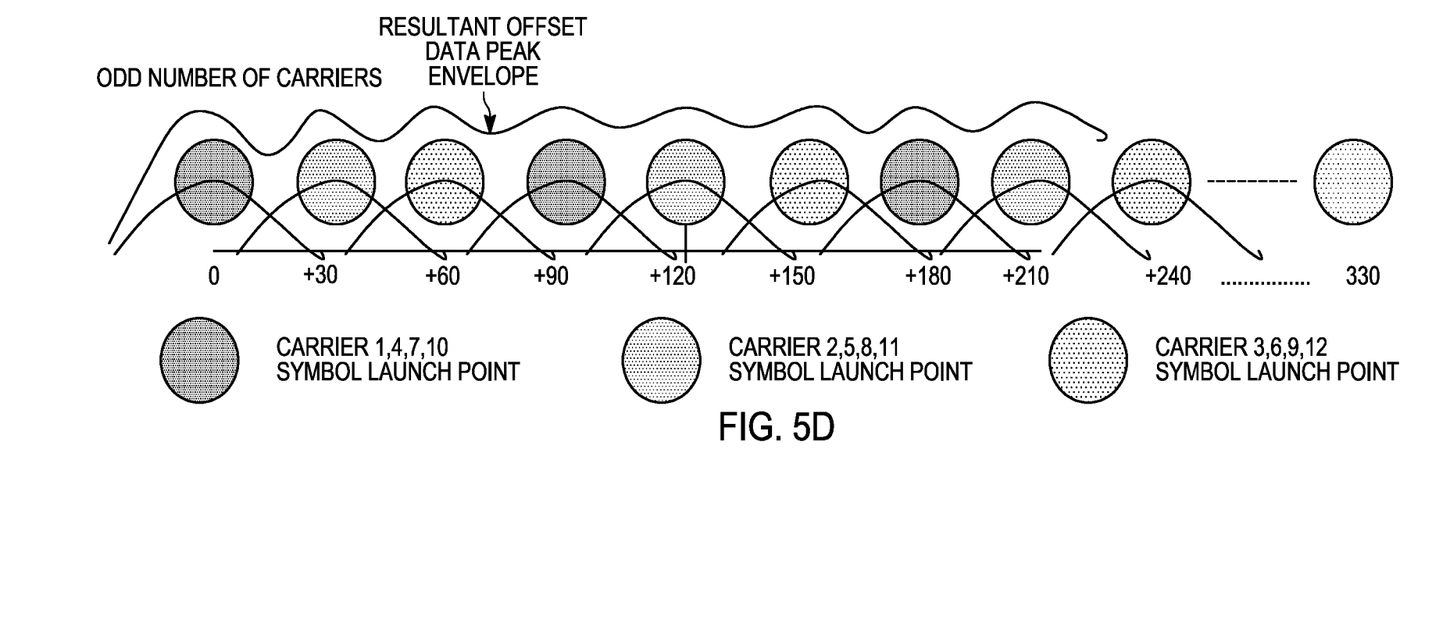

In another example, the base station device 100 is operating with an odd number of carrier signals, that is, three radio frequency sources 110A, 110B, 110C are activated. The three radio frequency sources 110A, 110B, 110C generate corresponding radio frequency carrier signals 115A, 115B, 115C. In this example, using the crest factor reduction technique of method 400, a first carrier modulator 120A initiates the modulation of the first radio frequency carrier signal 115A at a first time, for example, at time 0. A second carrier modulator 120B initiates the modulation of the second radio frequency carrier signal 115B at a second time that is the predetermined time offset after the first time. And a third carrier modulator 120C initiates modulation of the third radio frequency carrier signal 115C at a third time that is a second predetermined time offset after the first time (for example, initiating modulation, using the plurality of carrier modulators 120, of a third subset of the plurality of radio frequency carrier signals 115 at a third time). In this example, the predetermined time offset is selected to be approximately a third of the period of the baud rate of the information signals to effectuate a 30 degree phase shift of the peak power of the second modulated signal 125B. The second predetermined time offset is selected to be approximately two-thirds of the period of the baud rate of the information signals to effectuate a 60 degree phase shift of the peak power of the third modulated signal 125C. The resultant power characteristics of the output multi-carrier signal 155 is illustrated in FIG. 5D. As shown in FIG. 5D, the peaks are evenly distributed resulting in a reduction of the crest factor. Similarly, for any odd number of carriers, the plurality of radio frequency carrier signals 115 may be divided into a first subset, a second subset, and a third subset such that the first subset is launched at the first time, the second subset is launched at the second time, and the third subset is launched at the third time. The predetermined offset and the second predetermine offset may be between one-fourth and half of the period of the baud rate of the information signals depending on the configuration of the base station device 100 and allocation of calls to the base station device 100.

The method 400 includes transmitting, using one or more antennae 150, the multi-carrier signal 155 including the plurality of modulated signals 125 (at block 440). The plurality of modulated signals 125 are provided to the antenna 150, which transmits the output multi-carrier signal 155 to end user devices. The method 400 repeats for every call allocation set of the base station device 100.

Figure 6:
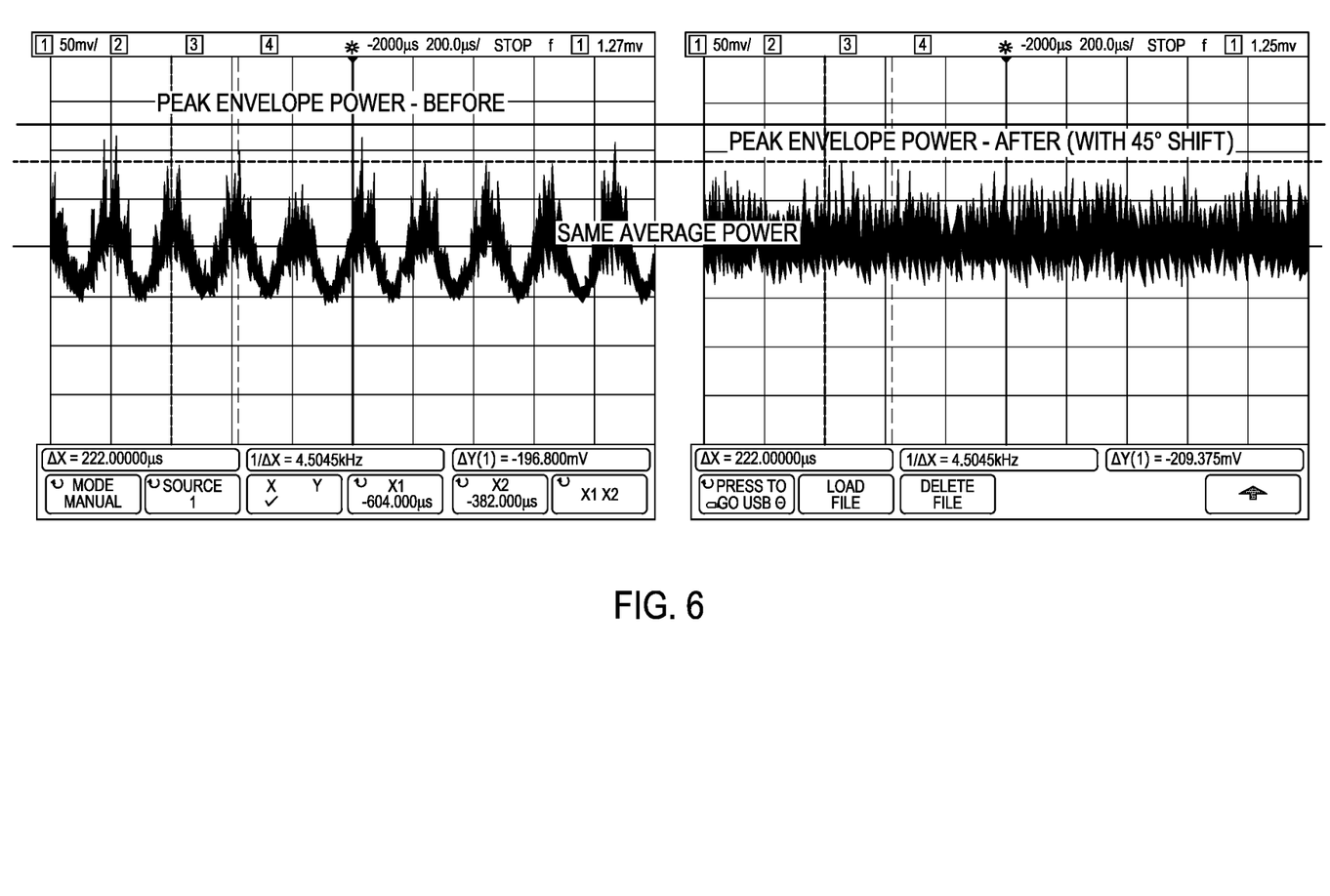
FIG. 6 is a graphical illustration of the peak power reduction provided by the crest factor reduction technique of FIG. 4 in accordance with some embodiments.
Figure 7:
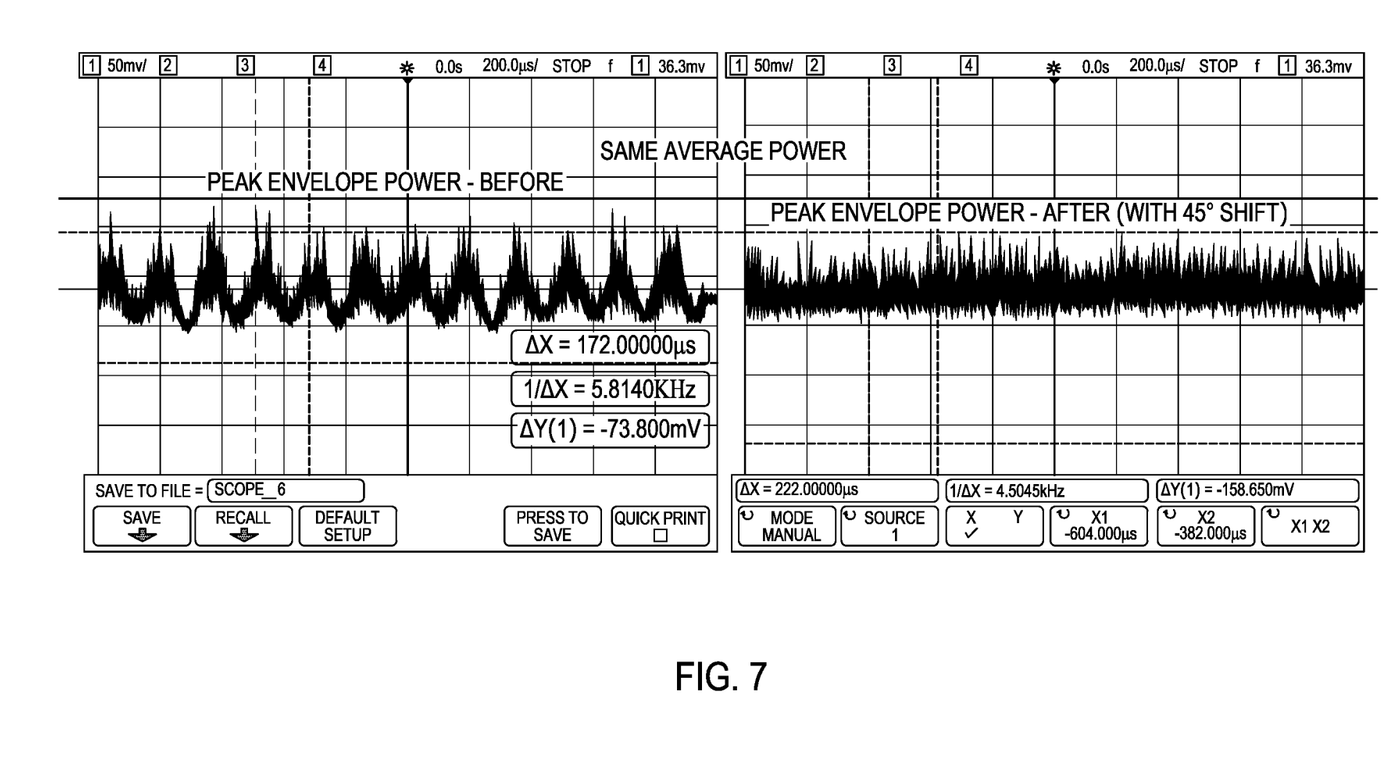
FIG. 7 is a graphical illustration of the peak power reduction provided by the crest factor reduction technique of FIG. 4 in accordance with some embodiments.

Crest factor reduction can be observed on any linearly modulated waveforms of a base station device 100 that uses the crest factor reduction technique of method 400. For example, the plurality of modulated signals 125 may include a plurality of linear simulcast modulation waveforms, a plurality of harmonized differential quadrature phase shift keying waveforms or a plurality of periodic time division multiple access based waveforms. FIG. 6 illustrates the crest factor reduction observed in a twelve carrier base station device 100 that modulates signals using linear simulcast modulation. In this example, modulation of a first subset of carriers (for example, first six carriers) is initiated at a first time and modulation of a second subset of carriers (for example, second six carriers) is initiated at a second time that is a predetermined time offset after the first time. The crest factor reduction technique resulted in a reduction of peak power by more than 2 decibels and power consumption savings of more than 250 Watts. FIG. 7 illustrates the crest factor reduction observed in a twelve carrier base station device 100 that modulates signals using harmonized differential quadrature phase shift keying waveforms. In this example, modulation of a first subset of carriers (for example, first six carriers) is initiated at a first time and modulation of a second subset of carriers (for example, second six carriers) is initiated at a second time that is a predetermined time offset after the first time. The crest factor reduction technique resulted in a reduction of peak power by more than 2 decibels and power consumption savings of more than 250 Watts.

Figure 8A:
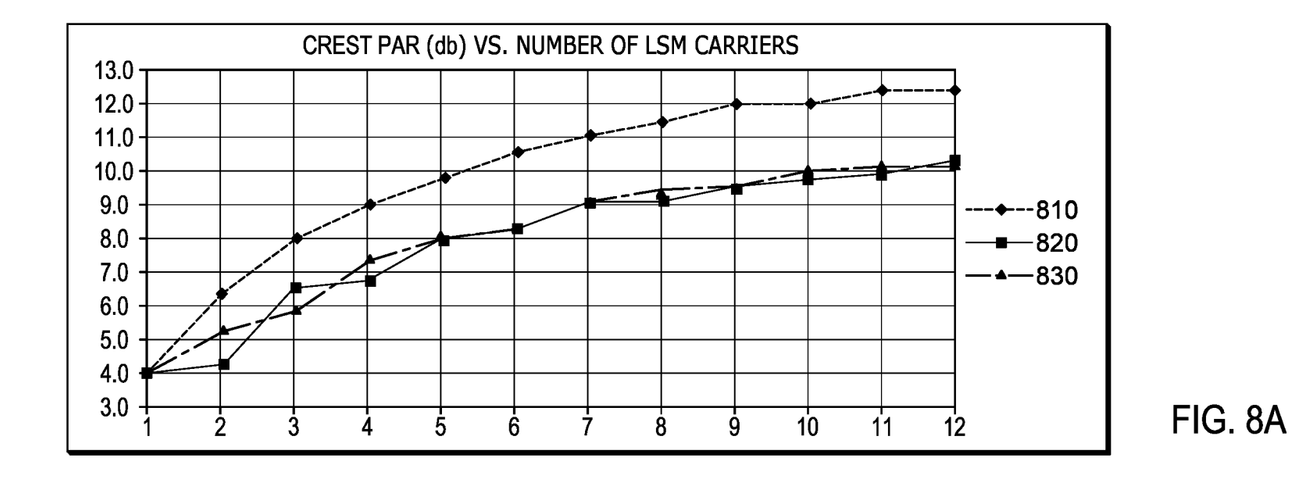
FIGS. 8A and 8B are a graphical illustration of the crest factor reduction against a number of carriers provided by the crest factor reduction technique of FIG. 4 in accordance with some embodiments.
Figure 8B:
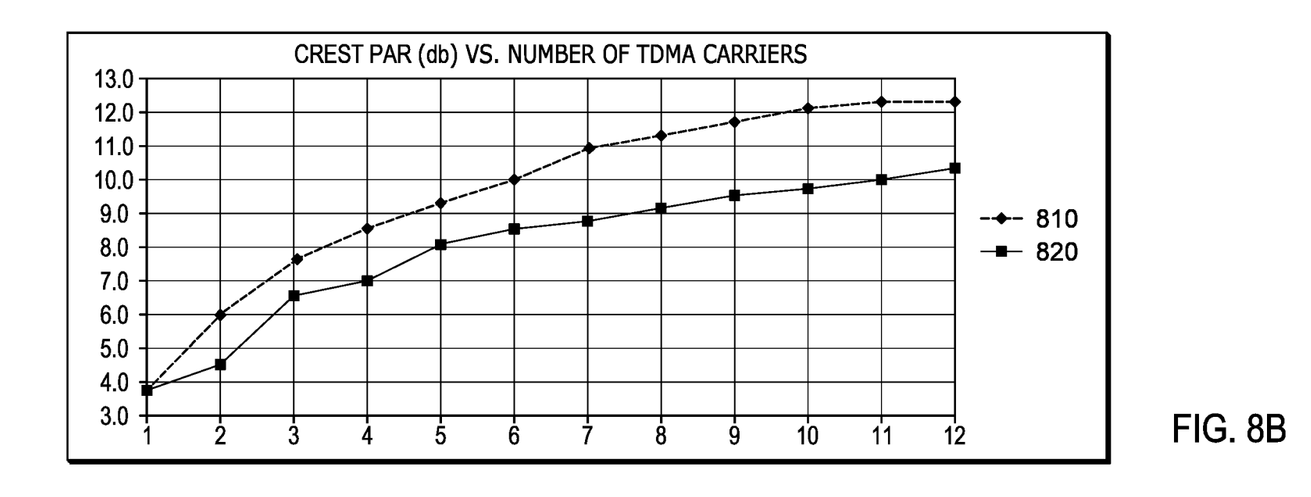

FIGS. 8A and 8B are graphical illustrations showing the crest factor reduction provided by the crest factor reduction technique of method 400 compared to a standard multi-carrier operation. FIG. 8A shows the peak power savings offered in a linear simulcast modulation multi-carrier operation. FIG. 8B shows the peak power savings offered in a time division multiple access multi-carrier operation. As shown in FIGS. 8A and 8B, line 810 tracks the peak power output of a standard multi-carrier operation for each number of multi-carriers. Line 820 illustrates the peak power output of a base station device 100 using the crest factor reduction technique of method 400 with two offset subsets of multi-carriers (that is, the plurality of radio frequency carrier signals 115 are divided into a first subset launched at a first time and a second subset launched at a second time). Line 830 illustrates the peak power output of a base station device 100 using the crest factor reduction technique of method 400 with three offset subsets of multi-carriers (that is, the plurality of radio frequency carrier signals 115 are divided into a first subset launched at a first time, a second subset launched at a second time, and a third subset launched at a third time).

The base station device 100 may determine the predetermined offset or the number of subset groupings of the plurality of radio frequency carrier signals 115 based on one or more of, for example, a number of carrier channels in the multi-carrier signal 155 (for example, even vs. odd), a distribution of carrier channels in the multi-carrier signal 155, statistical or historical use of each of the plurality of radio frequency carrier signal 115, and a distribution of the plurality of modulated signals 125 between the one or more power amplifiers 140, 210.

In some embodiments, the base station device 100 is part of a multi-site radio frequency transmitter system including a plurality of base station devices 100. In these embodiments, the offset groupings, that is, the number of subsets and the corresponding predetermined offset values in the launch times may be coordinated between the plurality of base station devices 100.

In one example, each carrier of the plurality of radio frequency carrier signals 115 may have a fixed predetermined offset. The electronic processor 160 determines the assignment of carriers between the plurality of base station devices 100. The electronic processor 160 then assigns a plurality of predetermined offset values to the plurality of radio frequency carriers 115 based on the assignment of carriers between the plurality of base station devices 100. For example, the multi-site system may include a first base station device 100 including a maximum number of carriers (for example, 12) and a second base station 100 including a lower number of carriers (for example, 8) than the first base station device 100. A first electronic processor 160 of the first base station device 100 may communicate with a second electronic processor 160 of the second base station device 100 to assign the plurality of predetermined offset values. The predetermined offset values may be assigned such that the modulation of a first radio frequency carrier signal 115 is initiated at the same time on both the first base station device 100 and the second base station device 100. That is, the symbol launch time on each base station device 100 occurs at the same time for a particular one of the plurality of radio frequency carrier signals 115. The predetermined offset values may be coordinated to optimize channel usage, minimize crest factor at each location, or to prioritize crest factor reduction at a master base station device 100.

In another example, the predetermined offset value may be assigned on a call per call basis to maximize crest factor reduction. The electronic processor 160 determines the assignment of calls between the plurality of base station devices 100. The electronic processor 160 then assigns a plurality of predetermined offset values to the plurality of radio frequency carriers 115 based on the assignment of calls between the plurality of base station devices 100. In these embodiments, the electronic processor 160 may also first determine which one of a plurality of calls needs to be offset. For example, the multi-site system may include a first base station device 100 and a second base station device 100 such that calls are assigned randomly or on a fixed basis between the first base station device 100 and a second base station device 100. A first electronic processor 160 of the first base station device 100 may communicate with a second electronic processor 160 of the second base station device 100 to assign the plurality of predetermined offset values. The predetermined offset values may be assigned such that when two or more radio frequency sources 110 are activated, the electronic processor 160 maintains a grouping of two or three subsets of plurality of radio frequency carrier signals 115. For example, when a first call and a second call are assigned to the base station device 100, the electronic processor 160 initiates modulation of the first call on a first radio frequency carrier signal 115A at a first time and initiates modulation of the second call on a second radio frequency carrier signals 115B at a second time. The second time is a predetermined offset after the first time, where the predetermined offset is half of a period of a baud rate of information signals of the first call and the second call. In some embodiments, the base station device 100 may have fixed predetermined offsets as described above and the electronic processor 160 may also control the assignment of each call between the plurality of radio frequency carrier signals 115 to distribute the calls between different predetermined offset values. Call per call basis assignment allows the base station device 100 to maintain a close ratio of 50% of active call that initiate modulation at the first time and the second time. Additionally, call per call basis assignment prevents activating all carriers with the same offset at the same time when the calls start and end randomly.

By reducing the crest factor as described above, the base station device 100 can reduce the input power demand, reduce the number of power amplifier block populated per amplifier deck, and increase the allowed maximum power per carrier.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A base station device for multi-carrier crest factor reduction, the base station device comprising:
   a plurality of radio frequency sources configured to generate a plurality of radio frequency carrier signals that each exhibit a periodic and repetitive envelope modulation component;
   a plurality of carrier modulators corresponding to the plurality of radio frequency sources and configured to modulate the plurality of radio frequency carrier signals with information signals and generate a plurality of modulated signals;
   a one or more antennae coupled to the plurality of carrier modulators and configured to transmit a multi-carrier signal including the plurality of modulated signals, the multi-carrier signal including a plurality of linear simulcast modulation waveforms having an envelope synchronous to the periodic and repetitive envelope modulation component of the plurality of radio frequency carrier signals; and
   an electronic processor coupled to the plurality of carrier modulators and configured to
      determine a time offset based on one or more selected from the group consisting of a number of carrier channels in the multi-carrier signal, a distribution of carrier channels in the multi-carrier signal, and a statistical use of each of the plurality of radio frequency carrier signals;
      initiate modulation, using the plurality of carrier modulators, of a first subset of the plurality of radio frequency carrier signals at a first time, and
      initiate modulation, using the plurality of carrier modulators, of a second subset of the plurality of radio frequency carrier signals at a second time, the second time being the time offset after the first time, wherein at least one of the first subset and the second subset include more than one of the plurality of radio frequency carrier signals.

2. The base station device of claim 1, further comprising a multi-carrier power amplifier coupled to the plurality of carrier modulators and configured to amplify the plurality of modulated signals, wherein the multi-carrier power amplifier provides amplified radio frequency signals to the one or more antennae.

3. The base station device of claim 1, further comprising a plurality of linear power amplifiers corresponding to the plurality of radio frequency sources, the plurality of linear power amplifiers coupled to the plurality of carrier modulators and configured to amplify the plurality of modulated signals, wherein the plurality of linear power amplifiers provide amplified radio frequency signals to the one or more antennae.

4. The base station device of claim 1, wherein the time offset is between one-fourth and half of a period of a baud rate of the information signals.

5. The base station device of claim 1, wherein the electronic processor is further configured to
determine a second time offset; and
initiate modulation, using the plurality of carrier modulators, of a third subset of the plurality of radio frequency carrier signals at a third time, the third time being the second time offset after the first time,
wherein the time offset is approximately one third of a period of a baud rate of the information signals and the second time offset is approximately two-thirds of the period of the baud rate of the information signals.

6. The base station device of claim 1, wherein the base station device is part of a multi-site radio frequency transmitter system including a plurality of base station devices and wherein the electronic processor is further configured to:
determine an assignment of carriers between the plurality of base station devices; and
assign a plurality of predetermined offset values to each of the plurality of radio frequency carrier signals based on the assignment of carriers between the plurality of base station devices.

7. The base station device of claim 1, wherein the base station device is part of a multi-site radio frequency transmitter system including a plurality of base station devices and wherein the electronic processor is further configured to:
determine an assignment of calls between the plurality of base station devices; and
assign a plurality of predetermined offset values to each of the plurality of radio frequency carrier signals based on the assignment of calls between the plurality of base station devices.

8. The base station device of claim 1, wherein the multi-carrier signal includes a plurality of harmonized differential quadrature phase shift keying waveforms.

9. The base station device of claim 1, wherein the multi-carrier signal includes a plurality of periodic time division multiple access based waveforms.

10. A method for multi-carrier crest factor reduction at a base station device, the method comprising:
generating, using a plurality of radio frequency sources, a plurality of radio frequency carrier signals that each exhibit a periodic and repetitive envelope modulation component that is synchronous to an envelope of a plurality of carriers present at an output of a one or more power amplifiers;
determining, using an electronic processor, a time offset based on one or more selected from the group consisting of a number of carrier channels in a multi-carrier signal, a distribution of carrier channels in the multi-carrier signal, and a statistical use of each of the plurality of radio frequency carrier signals;
initiating modulation, using a plurality of carrier modulators, of a first subset of the plurality of radio frequency carrier signals with information signals at a first time to generate a plurality of modulated signals;
initiating modulation, using the plurality of carrier modulators, of a second subset of the plurality of radio frequency carrier signals with the information signals at a second time to generate the plurality of modulated signals, the second time being the time offset after the first time, wherein at least one of the first subset and the second subset include more than one of the plurality of radio frequency carrier signals;
transmitting, using one or more antennae, the multi-carrier signal including the plurality of modulated signals as linear simulcast modulation waveforms having an envelope synchronous to the periodic and repetitive envelope modulation component of the plurality of radio frequency carrier signals.

11. The method of claim 10, the method further comprising:
receiving, at a multi-carrier power amplifier, the plurality of modulated signals; and
linearly amplifying, using the multi-carrier power amplifier, the plurality of modulated signals.

12. The method of claim 10, the method further comprising:
receiving, at a plurality of linear power amplifiers, the plurality of modulated signals; and
individually amplifying, using the plurality of linear power amplifiers, the plurality of modulated signals.

13. The method of claim 10, wherein the time offset is between one-fourth and half of a period of a baud rate of the information signals.

14. The method of claim 10, further comprising:
determining, using the electronic processor, a second time offset; and
initiating modulation, using the plurality of carrier modulators, of a third subset of the plurality of radio frequency carrier signals at a third time, the third time being the second time offset after the first time,
wherein the time offset is approximately one-third of a period of a baud rate of the information signals and the second time offset is approximately two-thirds of the period of the baud rate of the information signals.

15. The method of claim 10, wherein the base station device is part of a multi-site radio frequency transmitter system including a plurality of base station devices, the method further comprising:
determining an assignment of carriers between the plurality of base station devices; and
assigning a plurality of predetermined offset values to each of the plurality of radio frequency carrier signals based on the assignment of carriers between the plurality of base station devices.

16. The method of claim 10, wherein the base station device is part of a multi-site radio frequency transmitter system including a plurality of base station devices, the method further comprising:
determining an assignment of calls between the plurality of base station devices; and
assigning a plurality of predetermined offset values to each of the plurality of radio frequency carrier signals based on the assignment of calls between the plurality of base station devices.

17. The method of claim 10, wherein the multi-carrier signal includes a plurality of harmonized differential quadrature phase shift keying waveforms.

18. The method of claim 10, wherein the multi-carrier signal includes a plurality of periodic time division multiple access based waveforms.

19. A base station device for multi-carrier crest factor reduction, the base station device comprising:

a plurality of radio frequency sources configured to generate a plurality of radio frequency carrier signals that each exhibit a periodic and repetitive envelope modulation component;

a plurality of carrier modulators corresponding to the plurality of radio frequency sources and configured to modulate the plurality of radio frequency carrier signals with information signals and generate a plurality of modulated signals;

a one or more antennae coupled to the plurality of carrier modulators and configured to transmit a multi-carrier signal including the plurality of modulated signals, the multi-carrier signal including a plurality of linear simulcast modulation waveforms having an envelope synchronous to the periodic and repetitive envelope modulation component of the plurality of radio frequency carrier signals; and an electronic processor coupled to the plurality of carrier modulators and configured to
- determine a time offset based on one or more selected from the group consisting of a number of carrier channels in the multi-carrier signal, a distribution of carrier channels in the multi-carrier signal, a statistical use of each of the plurality of radio frequency carrier signals, and a distribution of the plurality of modulated signals between a plurality of power amplifiers;
- initiate modulation, using the plurality of carrier modulators, of a first subset of the plurality of radio frequency carrier signals at a first time, and
- initiate modulation, using the plurality of carrier modulators, of a second subset of the plurality of radio frequency carrier signals at a second time, the second time being the time offset after the first time, wherein at least one of the first subset and the second subset include more than one of the plurality of radio frequency carrier signals.

20. A method for multi-carrier crest factor reduction at a base station device, the method comprising:

generating, using a plurality of radio frequency sources, a plurality of radio frequency carrier signals that each exhibit a periodic and repetitive envelope modulation component that is synchronous to an envelope of a plurality of carriers present at an output of a one or more power amplifiers;

determining, using an electronic processor, a time offset based on one or more selected from the group consisting of a number of carrier channels in a multi-carrier signal, a distribution of carrier channels in the multi-carrier signal, and a statistical use of each of the plurality of radio frequency carrier signals, and a distribution of a plurality of modulated signals between a plurality of power amplifiers;

initiating modulation, using a plurality of carrier modulators, of a first subset of the plurality of radio frequency carrier signals with information signals at a first time to generate a plurality of modulated signals;

initiating modulation, using the plurality of carrier modulators, of a second subset of the plurality of radio frequency carrier signals with the information signals at a second time to generate the plurality of modulated signals, the second time being the time offset after the first time, wherein at least one of the first subset and the second subset include more than one of the plurality of radio frequency carrier signals;

transmitting, using one or more antennae, the multi-carrier signal including the plurality of modulated signals as linear simulcast modulation waveforms having an envelope synchronous to the periodic and repetitive envelope modulation component of the plurality of radio frequency carrier signals.

* * * * *